United States Patent
Jiang et al.

(10) Patent No.: US 9,917,517 B1
(45) Date of Patent: Mar. 13, 2018

(54) SWITCHED TANK CONVERTER

(71) Applicant: Google Inc., Mountain View, CA (US)

(72) Inventors: Shuai Jiang, Saratoga, CA (US);
Mobashar Yazdani, Santa Clara, CA (US); Xin Li, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/335,029

(22) Filed: Oct. 26, 2016

(51) Int. Cl.
*H02M 3/335* (2006.01)
*H02M 3/158* (2006.01)
*H02M 1/14* (2006.01)

(52) U.S. Cl.
CPC .............. *H02M 3/158* (2013.01); *H02M 1/14* (2013.01)

(58) Field of Classification Search
CPC ........... H02M 3/33592; H02M 3/3376; H02M 2001/0058; H02M 3/335; H02M 1/44; Y02B 70/1491
USPC ...... 363/16–17, 21.02, 21.03, 21.14, 37, 69, 363/71, 132; 323/271, 272, 282, 290
See application file for complete search history.

(56) References Cited

U.S. PATENT DOCUMENTS

| | | | |
|---|---|---|---|
| 4,648,017 A | 3/1987 | Nerone | |
| 4,720,667 A | 1/1988 | Lee et al. | |
| 4,720,668 A | 1/1988 | Lee et al. | |
| 4,841,220 A | 6/1989 | Tabisz et al. | |
| 4,857,822 A | 8/1989 | Tabisz et al. | |
| 5,343,140 A | 8/1994 | Gegner | |
| 5,471,376 A * | 11/1995 | Tsai | H02M 3/28 363/20 |
| 5,479,337 A | 12/1995 | Voigt | |
| 5,534,766 A | 7/1996 | Bonissone et al. | |
| 6,005,782 A | 12/1999 | Jain et al. | |
| 6,873,138 B2 | 3/2005 | Jacobson | |
| 7,138,789 B2 | 11/2006 | Moussaoui et al. | |
| 7,746,041 B2 | 6/2010 | Xu et al. | |
| 7,960,950 B2 | 6/2011 | Glovinsky | |
| 9,024,478 B2 * | 5/2015 | Cooley | H02J 3/385 307/82 |

(Continued)

FOREIGN PATENT DOCUMENTS

| | | |
|---|---|---|
| JP | 2008/072856 | 3/2008 |
| JP | 2010/148302 | 7/2010 |

(Continued)

OTHER PUBLICATIONS

Cao et al., "Multilevel modular converter with reduced device count for hybrid and electric vehicle," Transportation Electrification Conference and Expo (ITEC), 2015 IEEE, Jun. 2015, pp. 1-6.

(Continued)

*Primary Examiner* — Rajnikant Patel
(74) *Attorney, Agent, or Firm* — Fish & Richardson P.C.

(57) ABSTRACT

An apparatus that includes resonant tanks, switches, control logic and one or more non-resonant capacitors. The control logic that generates two or more sets of control signal inputs applied to the inputs of the switches so that for each set of control signals one or more sub-circuit loops are formed, and wherein the one or more sub-circuit loops for a first set of control signals is different from the one or more sub-circuit loops for a second set of control signals, and each of the sub-circuit loops includes one or more of the resonant tanks, and at least one of the sub-circuit loops includes a non-resonant capacitor.

20 Claims, 10 Drawing Sheets

(56) References Cited

U.S. PATENT DOCUMENTS

| | | |
|---|---|---|
| 2008/0253156 A1 | 10/2008 | Urakabe et al. |
| 2009/0237042 A1 | 9/2009 | Glovinski |
| 2011/0069514 A1* | 3/2011 | Chiba ............... H02M 3/33569 363/21.02 |
| 2012/0187926 A1 | 7/2012 | Glovinski |
| 2014/0232359 A1 | 8/2014 | Dash et al. |
| 2015/0077085 A1 | 3/2015 | Chen et al. |
| 2015/0077175 A1 | 3/2015 | Giuliano et al. |
| 2015/0115909 A1 | 4/2015 | Glovinski |
| 2016/0254754 A1* | 9/2016 | Perreault ............. H02M 3/3376 363/21.03 |

FOREIGN PATENT DOCUMENTS

| | | |
|---|---|---|
| WO | 2006/114719 | 11/2006 |
| WO | 2008/047374 | 4/2008 |

OTHER PUBLICATIONS

Cao et al., "Zero-Current-Switching Multilevel Modular Switched-Capacitor DC-DC Converter," IEEE Transactions on Industry Applications, 46(6):2536-2544, Sep. 2010.

Guo, "High efficiency charge pump based dc-dc converter for wide input/output range applications," Ph.D. dissertation, Electrical Engineering, North Carolina State University, 2010, 161 pages.

Keiser et al., "High Power Resonant Switched-Capacitor Step-Down Converter," 2008 IEEE Power Electronics Specialists Conference, Jun. 2008, pp. 2772-2777.

Kesarwani et al., "Resonant-Switched Capacitor Converters for Chip-Scale Power Delivery: Design and Implementation," IEEE Transactions on Power Electronics, 30(12):6966-6977, Dec. 2014.

Lei et al., "A General Method for Analyzing Resonant and Soft-Charging Operation of Switched-Capacitor Converters," IEEE Transactions on Power Electronics, 30(10):5650-5664, Dec. 2014.

Naresh et al., "Performance of Phase-Shift Control Using High-Efficiency Switched-Capacitor-Based Resonant Converter," Power Electronics and Renewable Energy Systems, vol. 326 of the series Lecture Notes in Electrical Engineering, Nov. 2014, pp. 591-600.

Peng et al., "A magnetic-less DC-DC converter for dual-voltage automotive systems," IEEE Transactions on Industry Applications, 39(2):511-518, Mar./Apr. 2003.

Shoyama et al., "Resonant Switched Capacitor Converter with High Efficiency," 2004 35th Annual IEEE Power Electronics Specialists Conference, Jun. 2004, pp. 3780-3786.

International Search Report and Written Opinion issued in International Application No. PCT/US2017/049560, dated Nov. 17, 2017, 15 pages.

* cited by examiner

SWITCHED TANK CONVERTER

BACKGROUND

This specification relates to DC-DC converters.

Converters for converting a first DC voltage to a second DC voltage are availing for a wide range of applications. Switched capacitor converters (SCC) are one example. A conventional SCC include multiple flying capacitors and switches. Input and output bulk capacitors are also typically required for power buffering and energy storage. The switches are typically controlled with a certain switching frequency, and multiple switching states are used to transfer power from an input to an output through charging and discharging flying capacitors. A SCC usually has a constant voltage conversion ratio and can support bidirectional power conversion.

Some SCC's also use inductor components to set certain resonant frequencies for switching. By driving the switches at resonant frequencies of the resulting charging and discharging circuits Zero Current Switching (ZCS) can be achieved.

SUMMARY

In general, one innovative aspect of the subject matter described in this specification is embodied in a device that includes a plurality of resonant tanks, each resonant tank including at least one resonant inductor and one resonant capacitor and having respective first and second nodes that are connected to respective circuit nodes in a circuit; a plurality of switches, each switch having first and second terminals and an input that receives a control signal that places the switch in either a closed state in which a conduction path is established between the first and second terminals, or an open state in which the conduction path is eliminated between the first and second terminals, and each first terminal and each second terminal connected to a respective circuit node in the circuit; one or more non-resonant capacitors having respective first and second nodes, and wherein each non-resonant capacitor has at least a first node connected to a circuit node formed by a connection of two switches that are each respectively connected to a respective resonant tank; and control logic that generates two or more sets of control signal inputs applied to the inputs of the switches so that for each set of control signals: one or more sub-circuit loops are formed, and wherein the one or more sub-circuit loops for a first set of control signals is different from the one or more sub-circuit loops for a second set of control signals, each of the one or more sub-circuit loops includes one or more of the resonant tanks, and at least one of the sub-circuit loops includes at least one non-resonant capacitor, and each of the one or more non-resonant capacitors facilitates clamping of a voltage across the first and second terminals of the switch when the switch is in an open state.

Another innovative aspect of the subject matter described is embodied in a device that includes a plurality of resonant tanks, each resonant tank including at least one resonant inductor and one resonant capacitor and having respective first and second nodes that are connected to respective circuit nodes in a circuit; a plurality of switches, each switch having first and second terminals and an input that receives a control signal that places the switch in either a closed state in which a conduction path is established between the first and second terminals, or an open state in which the conduction path is eliminated between the first and second terminals, and each first terminal and each second terminal connected to a respective circuit node in the circuit; and control logic that generates two or more sets of control signal inputs applied to the inputs of the switches so that for each set of control signals: at least two sub-circuit loops are formed, and wherein the at least two sub-circuit loops for a first set of control signals are different from the at least two sub-circuit loops for a second set of control signals, and at least one circuit node receives respective currents from at least two resonant tanks that are reversed in polarity with respect to each other such that the respective currents substantially cancel each other.

Particular embodiments of the subject matter described in this specification can be implemented so as to realize one or more of the following advantages. Each individual current conduction sub-circuit loop in a switched tank converter (STC) has an inductive impedance, and each flying capacitor is softly charged and discharged during normal operation due to the di/dt limit of the inductive impedance. This overcomes the inherent weakness of the conventional SCC where large inrush currents can be generated, instantaneously leading to charge redistribution losses, and resulting in high switching losses and high RMS current losses. When the switches of the STC topology have their drain-to-source voltages (Vds) clamped during the OFF state, parasitic ringing between the resonant inductors and switch junction capacitors is eliminated, thereby reducing the stress on each switch. Additionally, benefitting from the resonant operation of the resonant tanks, the switches of the STC can be controlled in a way such that ZCS is achieved, resulting in very low or negligible switching losses and very high efficiencies relative to circuits that do not have ZCS. A precharger-less duty cycle ramp start and intrinsic droop current sharing for parallel operation provide the control simplicity, modularity and scalability.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

The subject matter of this written description relates to a switched tank converter. The switched tank converter (STC) includes multiple flying resonant tanks, and each resonant tank includes at least one resonant inductor and at least one resonant capacitor. The resonant tanks are each connected to two circuit nodes. The switched tank converter also includes one or more flying non-resonant capacitors, and each non-resonant capacitor has at least a first node connected to a circuit node other than ground. Additionally, multiple switches are connected to the circuit nodes. The switches are driven by a control logic that generates two or more sets of control signal inputs applied to the inputs of the switches. For each set of control signals, one or more sub-circuit loops are formed. Each sub-circuit loop for a first set of control signals is different from each sub-circuit loop for a second set of control signals, and each sub-circuit loop includes one or more of the resonant tanks. At least one of the sub-circuit loops includes at least one non-resonant capacitor. Each of the non-resonant capacitors facilitates clamping of a voltage across the switch when the switch is in an open state. Finally, in some implementations, the control logic generates each set of control signals to cause zero current switching in each of the switches.

Figure 1:
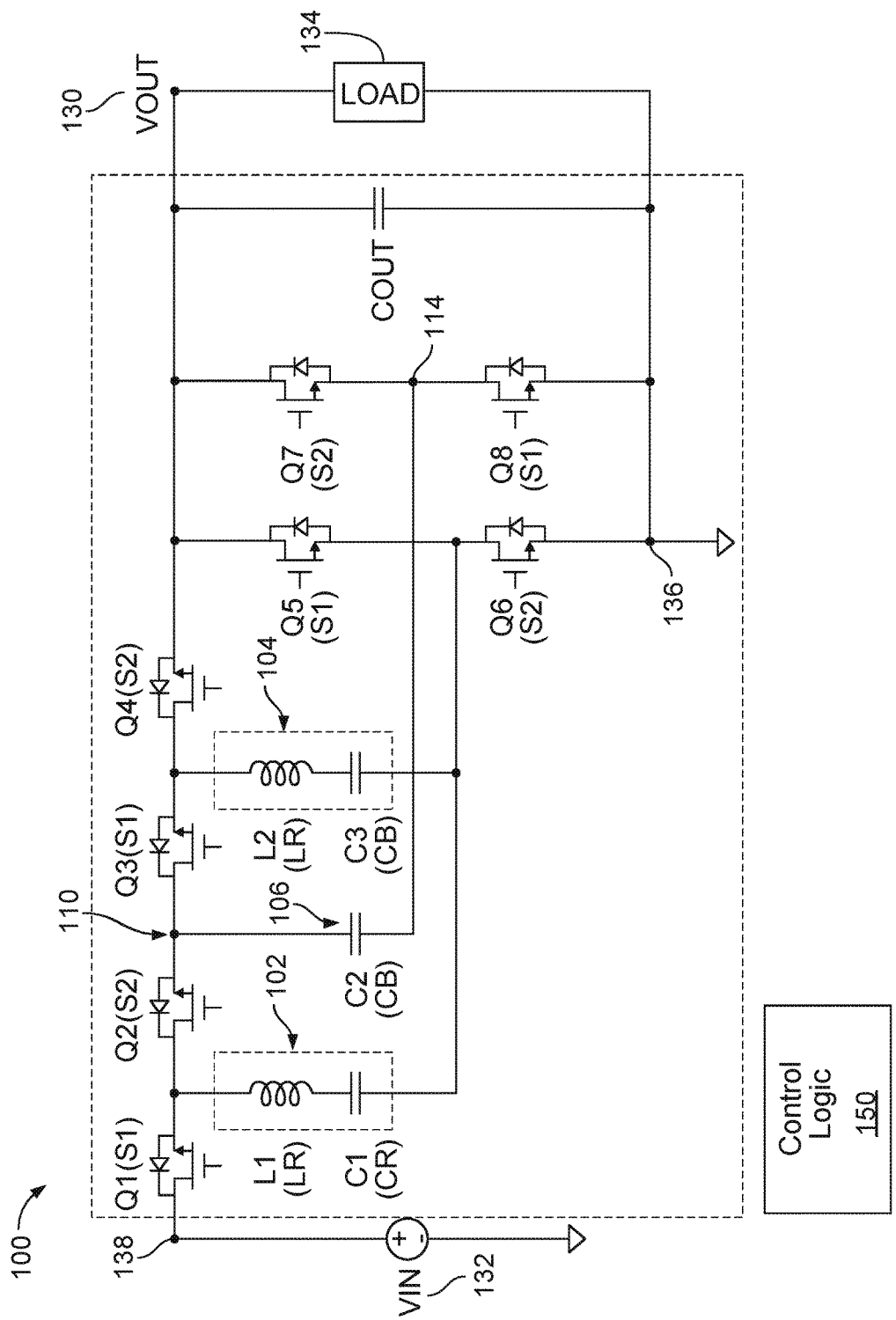
FIG. 1 is a circuit diagram of a 1-phase 4-to-1 STC topology with full-wave output rectification.

FIG. 1 is a circuit diagram of a 1-phase 4-to-1 STC topology with full-wave output rectification. The circuit 100 is constructed on or within a circuit bearing structure, such as a printed circuit board, silicon substrate, or any other circuit bearing structure.

The circuit 100 includes a plurality of flying resonant tanks 102 and 104. Each resonant tank includes at least one resonant inductor Lr and one resonant capacitor Cr, and has first and second nodes. In some instances, a resonant inductor in a resonant tank may be a stray inductance of a circuit bearing structure. The circuit 100 also includes one or more flying non-resonant capacitors 106, each with respective first and second nodes. As used in this specification, a non-resonant capacitor is a capacitor that is separate from a resonant tank and does not contribute to the characteristic resonant frequency of the resonant tank itself.

In the example circuit 100, only one non-resonant capacitor 106 is included in the circuit. However, more than one non-resonant capacitor can be used, depending on the topology of the STC circuit. In a particular switching state, each resonant tank can be connected in series or in parallel with a particular non-resonant capacitor, depending on the circuit topology and application. Other example STC circuits will be described with reference to FIGS. 5-9 below.

In the circuit 100 of FIG. 1, the non-resonant capacitor 106 has a first node connected to a circuit node 110 formed by a connection to switches Q2 and Q3 that are each respectively connected to a respective resonant tank 102 and 104. In some implementations, the other node of the non-resonant capacitor may be connected to another connected pair of switches that are respectively connected to resonant tanks. In other implementations, the other node of the non-resonant capacitor may be directly connected to ground or may be switched to ground through a switch connection. This latter implementation is shown in FIG. 1, where the non-resonant capacitor is connected to circuit node 114 formed by a connection to switches Q7 and Q8.

A plurality of switches Q1, Q2, Q3, Q4, Q5, Q6, Q7 and Q8 have respective first and second terminals and an input. The input receives a control signal that places the switch in an "off" state in which a conduction path is eliminated between the first and second terminals, or an "on" state in which the conduction path is established between the first and second terminals. In the example of FIG. 1, N-channel MOSFET switches are used. However, other types of switches can also be used.

During operation, the current flow direction in the switches differentiates the switches into two categories—main switches and synchronous-rectifier (SR) switches. For the N-Channel MOSFETs of FIG. 1, a main switch has its current flow from drain to source in normal operation, and a SR switch has its current flow from source to drain. Thus, switches Q1-Q4 are main switches, and Q5-Q8 are the synchronous rectifier (SR) switches. In some applications, SR switches can be replaced by diodes, where the diodes are forward biased in the "on" state and being reversed biased in the "off" state.

In the circuit of FIG. 1, the main switches are coupled between the input voltage VIN 132 and either the low voltage side VOUT 130 or system ground 136, while the SR switches are coupled between VOUT 130 and system ground 136. For a step-up STC, the main switches are swapped with the SR switches.

In the circuit of FIG. 1, the switches are divided into two switch groups, and each switch group receives a same input signal at the respective inputs of the switches. The switch groups are respectively identified by the input signals S1 and S2 at the switch inputs in FIG. 1. As will be described in more detail with reference to FIGS. 2A-2C below, the first switch group shares the same control signal input from the control logic 150, and the second switch group shares a control signal input from the control logic 150 that is an approximately 180-degree phase shift from the input to the first switch group. The duty cycles for both control signal inputs are the same, or approximately the same.

The sets of control signal inputs applied to the inputs of the switches Q so that two or more respective sub-circuit loops that are different from each other are formed between the STC input node 138 and the STC output node 130. Each sub-circuit loop includes one or more resonant tanks and at least one sub-circuit loops includes one or more non-resonant capacitors. The non-resonant capacitor of the sub-circuit loop also facilitates clamping of a voltage across the terminals of the switch when the switch is in the open state. The sub-circuit loops resulting from the switching operations in the circuit of FIG. 1 are described in more detail with reference to FIGS. 2A and 2B.

In some implementations, the control logic 150 controls the switches such that they are turned on and off at zero current, e.g., zero current switching (ZCS). This ZCS feature reduces switching losses when compared to switching when current is flowing in the switches. Furthermore, the circuit 100 allows larger voltage ripples on the flying resonant capacitors due to the lossless switching feature. Hence, the flying capacitor sizes may be reduced when compared to those that are used in a system that does not have ZCS. In some implementations, the switching may instead occur without ZCS.

The "on" and "off" time of each switching state depends on the resonant frequency of the inductors and flying resonant capacitors involved in that particular switching state. Also, as input and output bulk capacitors and flying non-resonant capacitors usually do not participate in the resonance, such capacitors can reasonably be treated as voltage sources, which have negligible impact to the resonant frequency. Ideally, the "on" time of a switching state equals to half of the sinusoid resonant period of the equivalent LC circuit. In practice, however, because the existence of series resistance introduces some damping to the resonant circuit, the actual "on" time of each switching state can be tuned to deviate slightly from half of the sinusoid resonant time period to achieve ZCS.

Figure 2A:
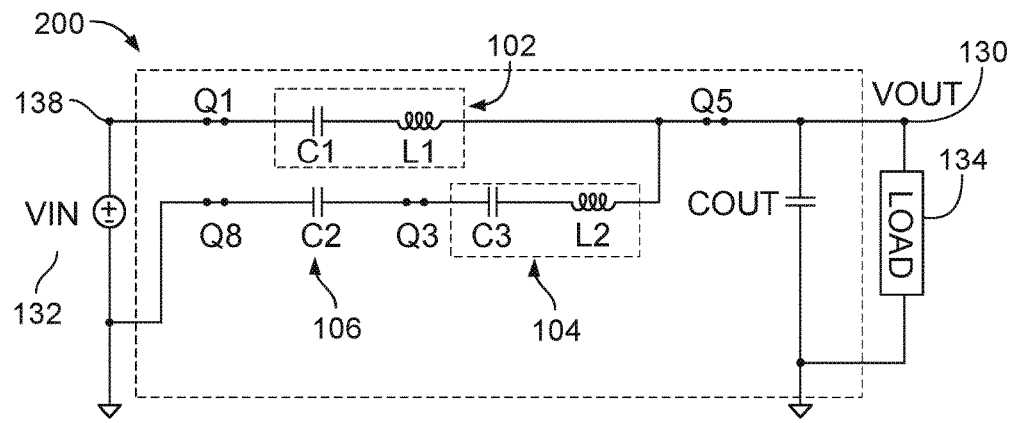
FIG. 2A is a circuit diagram of a first set of sub-circuit loops of the circuit FIG. 1.
Figure 2B:
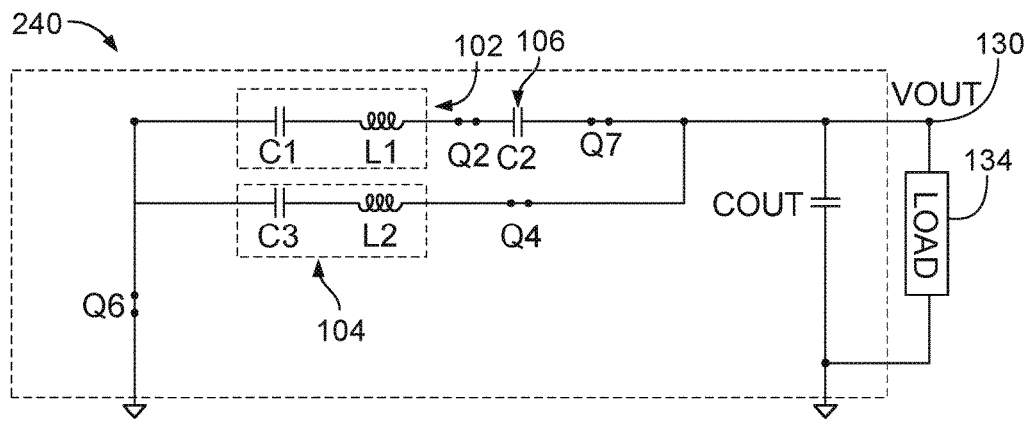
FIG. 2B is a circuit diagram of a second set of sub-circuit loops of the circuit of FIG. 1.
Figure 2C:
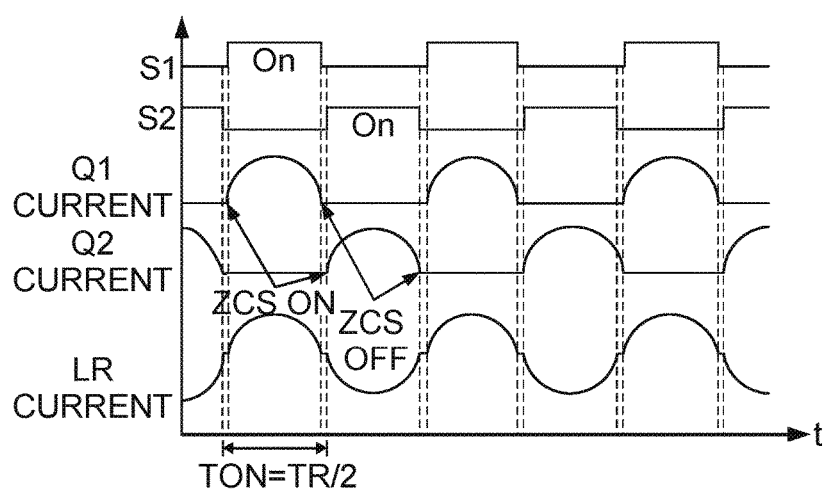
FIG. 2C is a timing diagram of the control input signals for the switches and the current waveforms of the circuits depicted if FIG. 2A and FIG. 2B during charging and discharging states.

As described above, various charge and discharging states can be realized by use of the control logic 150, resulting in different sub-circuit loops. FIG. 2A is a circuit diagram of a first set of sub-circuit 200 loops of the circuit 100 FIG. 1, and FIG. 2B is a circuit diagram of a second set of sub-circuit loops 240 of the circuit 100. FIG. 2C is a timing diagram of the input signals for the switches and the current waveforms of the circuits depicted if FIG. 2A and FIG. 2B during charging and discharging states.

With reference to FIG. 2A, the sub-circuit loop set 200 is formed with the signal S1 is "on" and the signal S2 is "off", resulting in the switches Q1, Q3, Q5, and Q8 being closed, and Q2, Q4, Q6 and Q7 being open. The sub-circuit loop formed by the path through VIN, Q1, C1, L1, L2, C3, Q3, C2 and Q8 includes the resonant tanks 102 and 104 and the non-resonant capacitor C2. Conversely, the sub-circuit loop set 240, in FIG. 2B, is formed when signal S1 is "off" and the signal S2 is "on" resulting in the switches Q1, Q3, Q5, and Q8 being open, and Q2, Q4, Q6 and Q7 being closed. The particular sub-circuit loop formed by the path through C1, L1, Q2, C2, Q7, Q4, L2 and C3 includes the resonant tanks 102 and 104 and the non-resonant capacitor C2.

Note that there are dead times between the respective states during which both control input signals S1 and S2 are "off" and all the switches Q of the circuit 100 are in the open state. This third set of control signal inputs accommodate ZCS. In this instance, the first and second sets of control signals, S1 and S2, have respective duty cycles of less than 50%. This dead time is usually minimal to accommodate current reset when all switches are off however, and ZCS can be accomplished with just the first two sets of control signals, by setting the "on" time of S1 ("off" for S2) and the "on" time for S2 ("off" for S1) to approximately half of the sinusoid resonant period of the resonant tanks, as well as accounting for resistive damping in the circuit elements.

The two sub-circuit loop sets 200 and 210 of circuit 100 demonstrate how inductive impedances are seen in each sub-circuit during the different switching states. Each sub-circuit has an LC resonant tank with inductive impedance at high frequency. Therefore, every flying capacitor (both resonant and non-resonant) is softly charged and discharged during normal operation, due to the di/dt limit from inductor. This reduces or eliminates inrush current or charge redistribution losses associated with flying capacitor voltage ripples in conventional SC converters.

In the example of FIG. 1, the non-resonant capacitor 106 has larger capacitance than the capacitors of the LC tanks. In some implementations, the non-resonant capacitors may be approximately over an order of magnitude higher than the capacitors of the resonant tank. Because the capacitance of the non-resonant capacitor 106 is much higher than that of the resonant capacitors C1 and C3 in the resonant tanks 102 and 104, the equivalent series capacitances are dominated by the smaller, resonant capacitor C1 and C3. In an example implementation, high performance Class-I (e.g., C0G, U2J) MLCC capacitors can be used as resonant capacitors for their small tolerance and low ESR over a wide voltage and temperature range. Class-II (X5R, X7R, etc.) MLCC capacitors can be used as non-resonant capacitors.

The timing diagram illustrated in FIG. 2C shows the input signals for the switches and the current waveforms of the sub-circuits of FIGS. 2A and 2B in their charging and discharging states, respectively. As indicated by the timing diagram 300, the switches in control group S1 and the switches in control group S2 are toggled "on" and "of" respectively, according to the resonant frequencies of the sub-circuits 200 and 210. This facilitates ZCS, as illustrated by the respective charge and discharge currents in Q1 and in Q2. The resulting current in the resonant tank 102 is shown as the Lr Current in FIG. 2C.

Figure 3A:
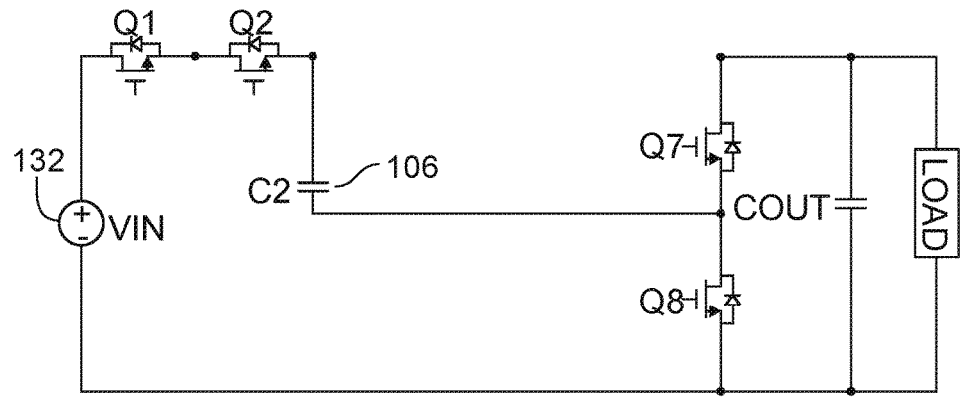
FIGS. 3A-3C are circuit diagrams that illustrate clamping of switch voltages during various switch states.
Figure 3B:
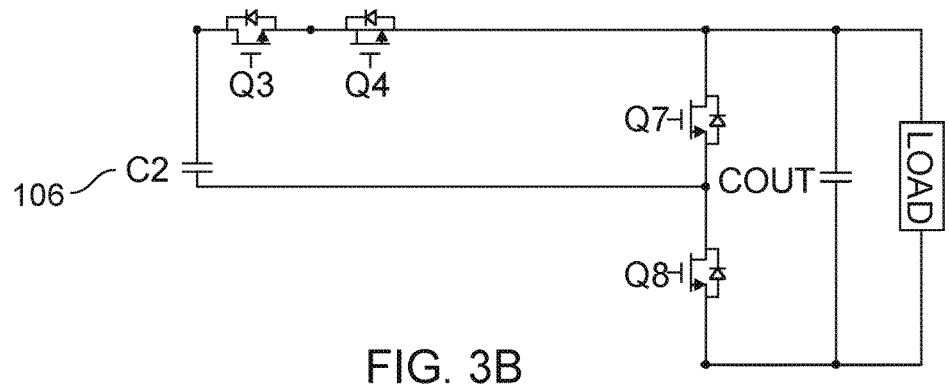
Figure 3C:
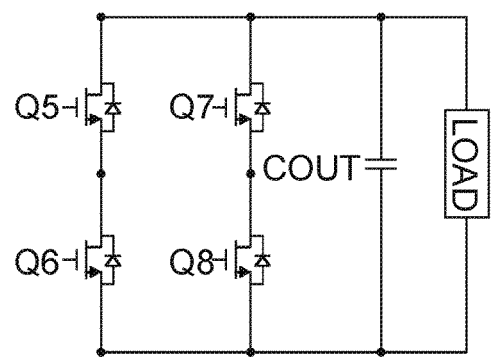

In the topology illustrated in FIG. 1, each of the switches in various switch states have their respective drain-to-source voltage (Vds) clamped by a combination of VIN 132, VOUT 130 and the non-resonant capacitor 106 during the "off" states of each switch. FIGS. 3A-3C demonstrate the clamping of the switches of FIG. 1 through different clamp paths. The resonant tanks 102 and 104 do not appear in the clamp paths, eliminating the possibility of parasitic ringing between resonant inductors Lr and the switch junction capacitors in the circuit and reducing the Vds stress on each switch.

In some implementations, at least one of the circuit nodes receives respective currents from at least two resonant tanks that are reversed in polarity with respect to each other such that they tend to cancel each other out such that the non-resonant capacitor connected to that particular circuit node can be very small relative to a non-resonant capacitor that would be required if the currents did not tend to cancel each other out.

Figure 4A:
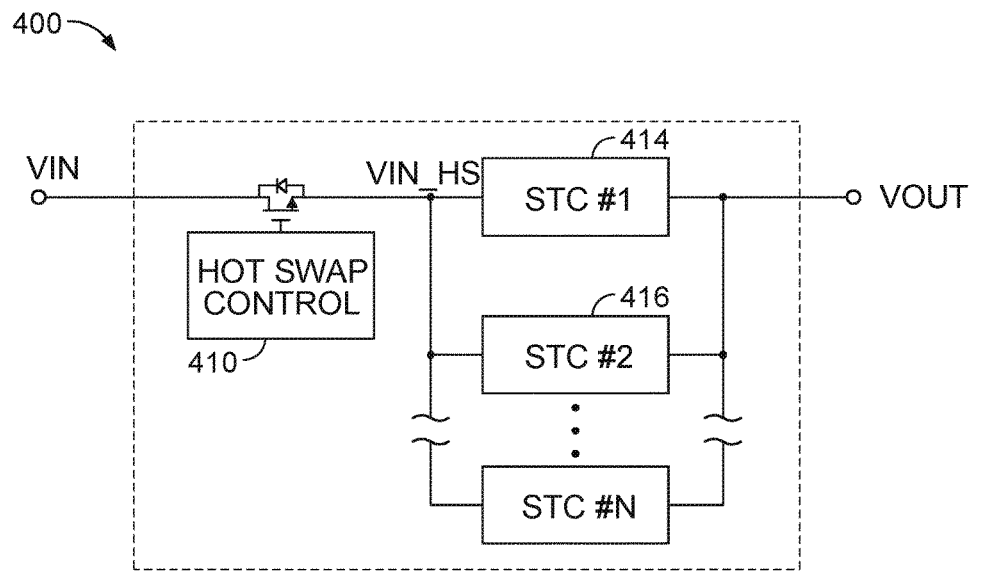
FIG. 4A is a block diagram of a power system architecture including multiple paralleled STCs with a front-end hot swap.

The STC of FIG. 1 can be used as a stand-alone converter. However, multiple STCs can be connected in parallel for multi-phase or multi-cell operation. FIG. 4A is a block diagram of an example power system architecture including multiple paralleled STCs, including 414 and 416, and hot swap control 410. Multiple STCs in parallel can be used when power delivery requirements exceed the power delivery capability of a single STC. Such a configuration offers the flexibility of STC control logic with hot swap functionality. For example, STC 414 inserted into circuit 400 can start up once the VIN_HS 408 has reached a threshold voltage such that the gate drive and control logic circuitries are powered, but is still below the Vds rating of the switches within STC 414. This type of topology additionally benefits from fault protections, where the hot swap controller 410 can shut off power to an individual STC upon receiving fault notifications, (such as over-temperature, over-voltage, or over-current), from the controller of the individual STC 414.

The parallel STC architecture can also be extended to a variety of applications where high voltage conversion ratios are required, but galvanic isolation is not.

Figure 4B:
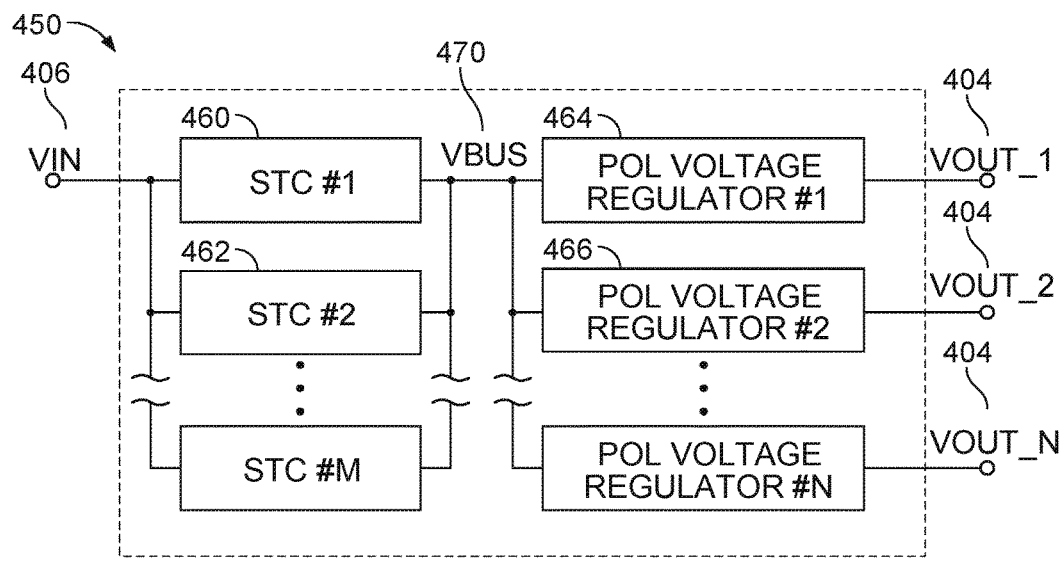
FIG. 4B is a block diagram of two-stage point of load (POL) power conversion architecture that incorporate STCs.

In another configuration, a single or multiple STCs can be connected in parallel in a two-stage point of load (PoL) power conversion architecture. Again, multiple STCs may be used in parallel when a power delivery requirement exceeds the power delivery capability of any one STC. FIG. 4B is a block diagram of an example two-stage PoL power conversion delivery architecture 450 that incorporates multiple STCs, including 460 and 462, in parallel and multiple point of load converters, including 464 and 466. In FIG. 4B, the STCs, including 460 and 462, receive input voltage VIN 406 and step down the voltage to an intermediate bus voltage VIB 470. The point of load converters, including 464 and 466, each receive the intermediate bus voltage as input and generate a corresponding output regulated VOUT 404, whose voltage value depends on the voltage requirements of the load. One example implementation receives a 48V input and generates a 12V output. A pulse width modulation (PWM) interleaving technique can be applied for parallel operation to reduce input and output voltage ripples.

Figure 5:
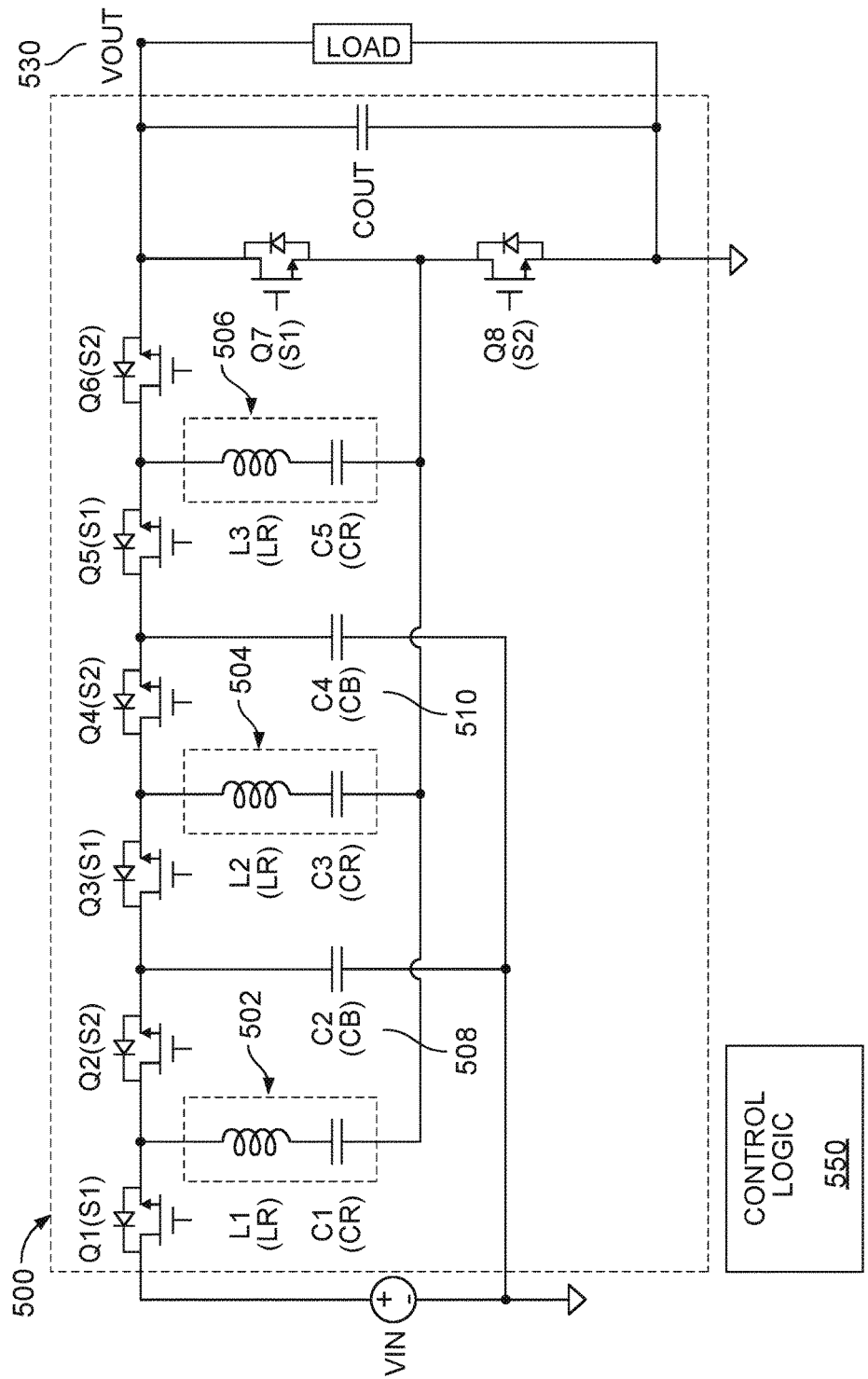
FIG. 5 is a circuit diagram of a 1-phase 4-to-1 STC topology with half-wave output rectification
Figure 6:
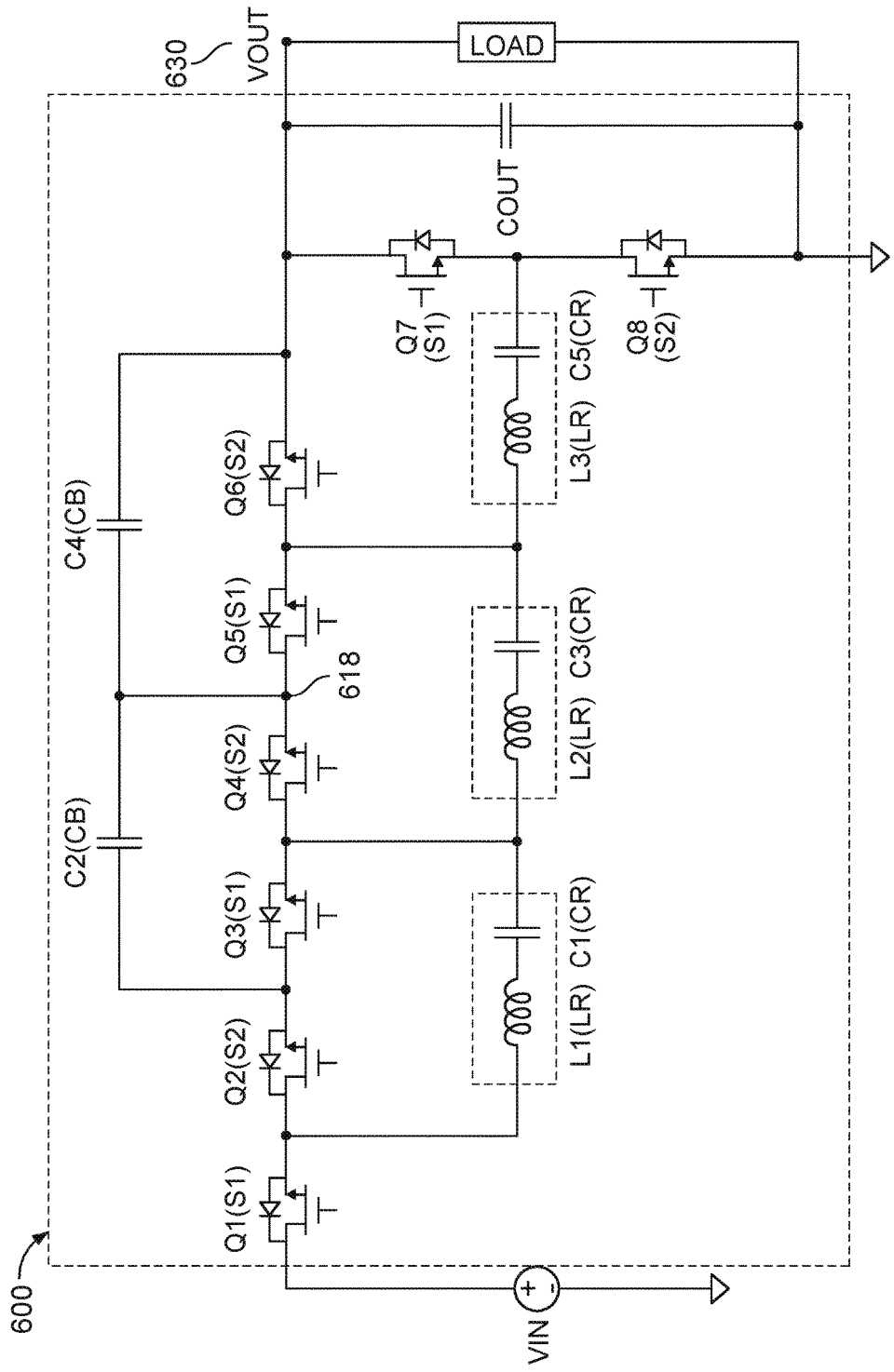
FIG. 6 is a circuit diagram of another 1-phase 4-to-1 STC topology with half-wave output rectification.

Although the implementation of the STC has been described in the context of a 4-to-1 topology with full-wave output rectification, the STC can be implemented in multiple other topologies and voltage conversion ratios. Examples of such topologies are illustrated by FIGS. 5-10. An example of a 1-phase 4-to-1 half-wave output rectification STC topology is illustrated in FIG. 5, where the output current is a half-wave sinusoid. In FIG. 5, circuit 500 includes main switches Q1-Q6, synchronous rectifier (SR) switches Q7-Q8, resonant tanks 502, 504, and 506, each including a resonant inductor Lr and resonant capacitor Cr, and non-resonant capacitors 508 and 510. Control signal inputs at each switch Q is provided by control logic 550. At steady state, all switches Q1-Q8 are biased by VOUT 530 during their respective "off" states. Each flying capacitor, resonant and non-resonant, has approximately identical ripple current, though each may be biased by different DC voltages (e.g., VOUT, 2*VOUT, and 3*VOUT) during normal operation. However, in other topologies, flying capacitors may be biased by a same voltage. For example, in the circuit diagram 600 shown in FIG. 6, each flying capacitor is biased by the same DC voltage VOUT 630, and the respective ripple currents of each flying capacitor may vary. FIGS. 5 and 6 illustrate the design and performance tradeoffs that can be made between capacitor ripple currents and DC bias voltages.

Figure 7:
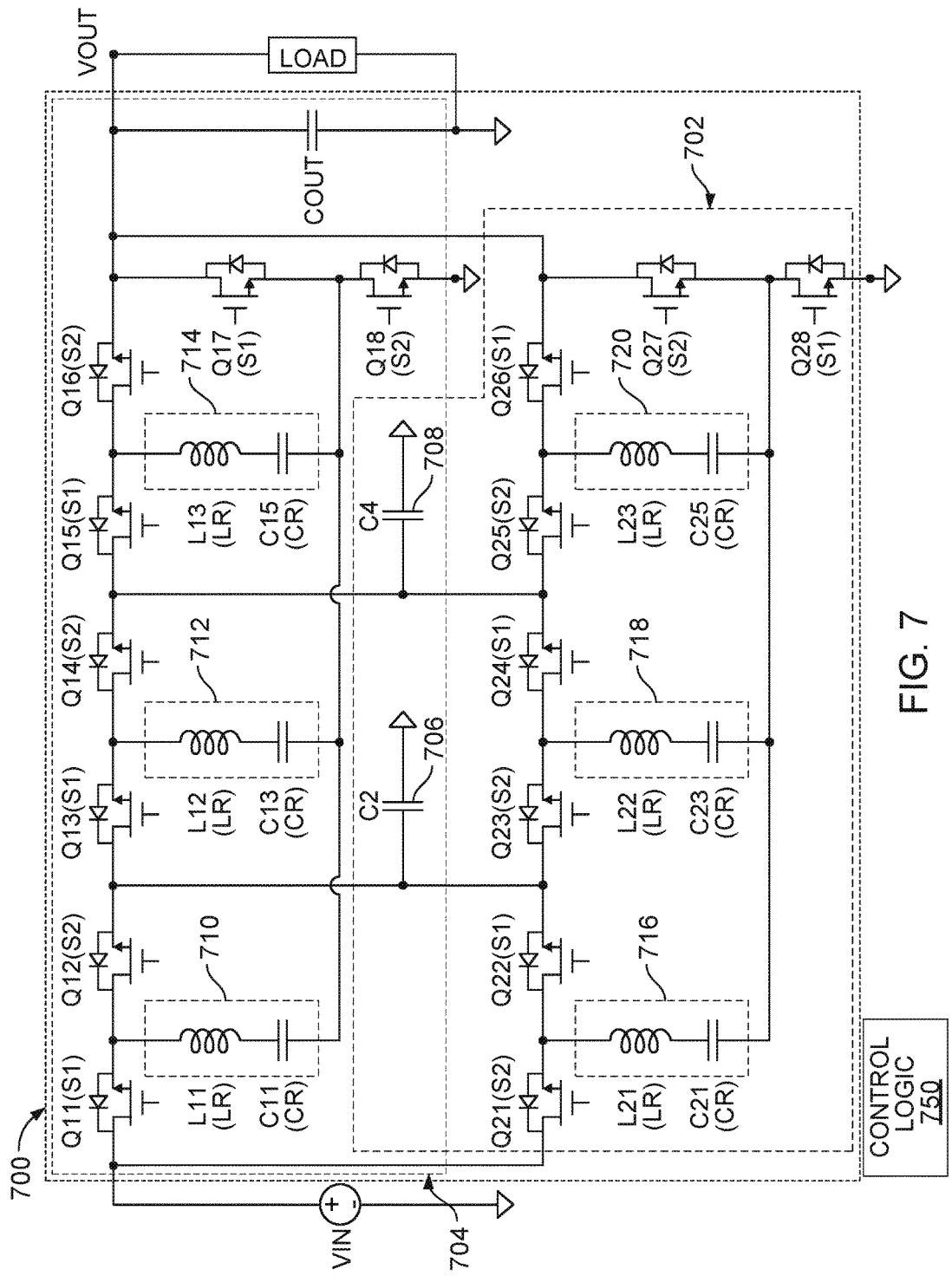
FIG. 7 is a circuit diagram of a 2-phase 4-to-1 STC topology with full-wave output rectification.
Figure 8:
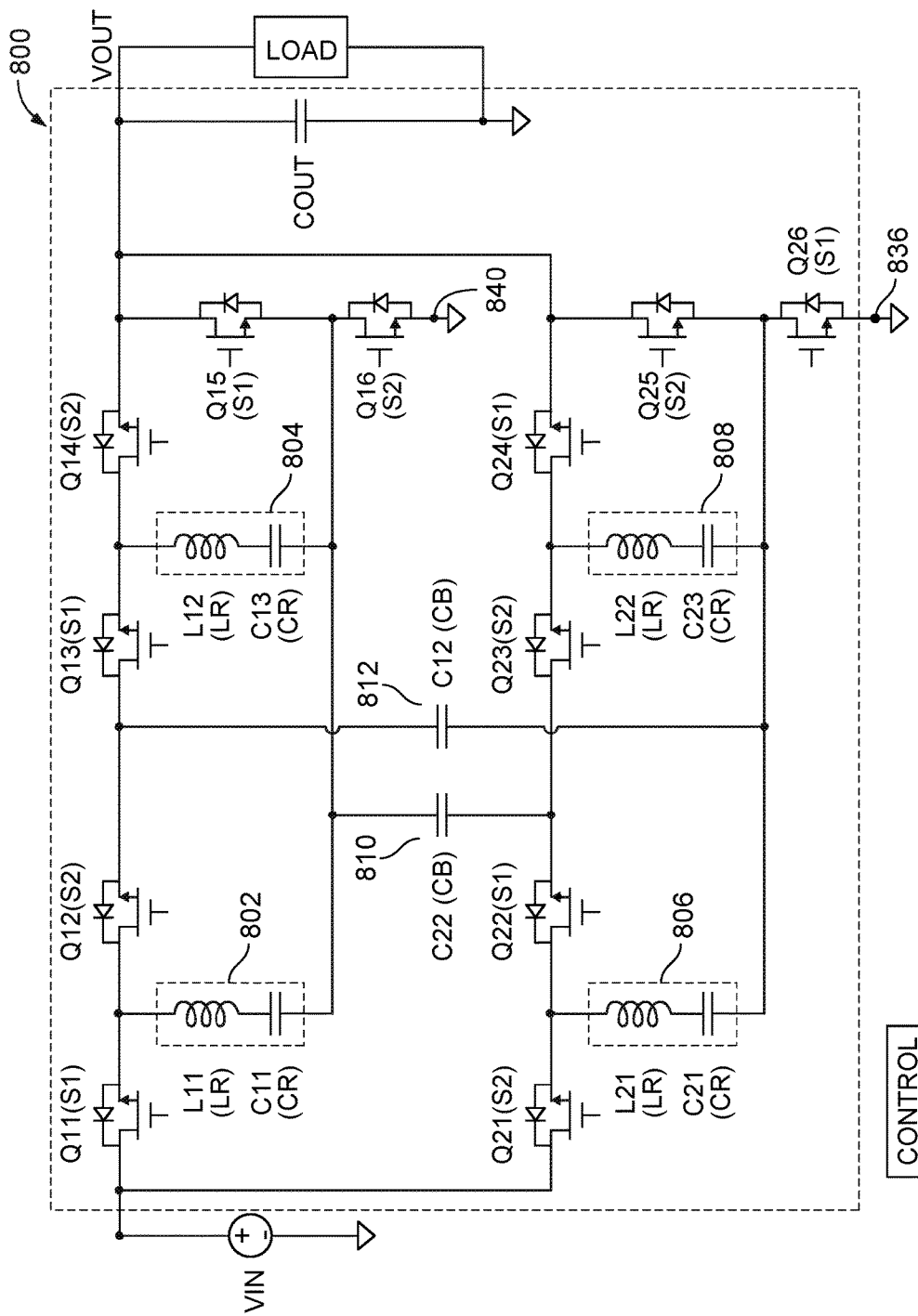
FIG. 8 is a circuit diagram of another 2-phase 4-to-1 STC topology with full-wave output rectification.

Two example circuit diagrams of 2-phase 4-to-1 full-wave output rectification STC topologies are depicted in FIGS. 7 and 8. In FIG. 7, resonant tanks 710, 712, and 714 belong to a first phase sub-circuit 704, and resonant tanks 716, 718, and 720 belong to a second phase sub-circuit 702. Non-resonant capacitors 706 and 708 are coupled to both phase sub-circuits 702 and 704. The two different phase sub-circuits are controlled by control logic 750 in an approximately 180 degree phase shift, such that the ripple currents in the non-resonant capacitors 706 and 708 are minimized. The interleaving between the two phases of the circuit 700, represented by sub-circuits 702 and 704, gives the potential to significantly reduce the non-resonant capacitors 706 and 708.

The circuit diagram 800 in FIG. 8 includes resonant tanks 802, 804, 806 and 808, and non-resonant capacitors 810 and 812, that are included both sub-circuits S1 and S2 as determined by input control from control logic 850. Sub-circuit S1 includes switches Q11, Q13, Q15, Q22, Q24, and Q26. The switch Q26 is connected to a circuit node at one lead, and to ground 836 with the other lead. Sub-circuit S2 includes switches Q12, Q14, Q16, Q21, Q23, and Q25. The switch Q16 is connected to a circuit node at one lead, and to ground 840 with the other lead. The SR switches Q15, Q16, Q25, and Q26 are symmetrical and each carry approximately the same current, forming part of the output full-bridge topology 800.

Figure 9:
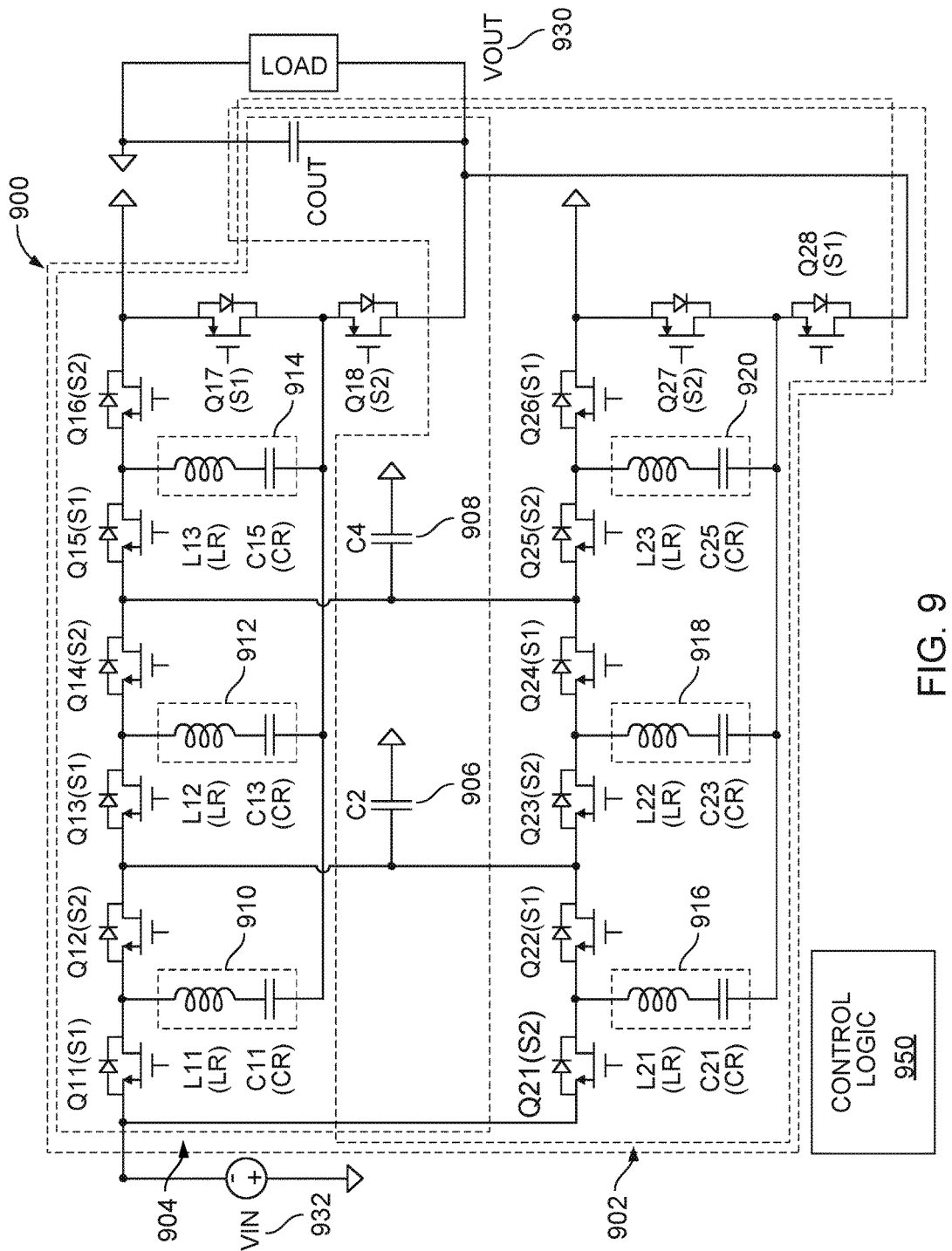
FIG. 9 is a modified circuit diagram of FIG. 7 to realize reversed polarity power conversion

A modified circuit diagram of FIG. 7 in which reversed polarity power conversion can be achieved using STCs is depicted in FIG. 9. In FIG. 9, the resonant tanks 910, 912, and 914 belong to a first phase sub-circuit 904, and resonant tanks 916, 918, and 920 belong to a second phase sub-circuit 902. The non-resonant capacitors 906 and 908 have one lead each to both sub-circuits 902 and 904, and the other respective leads are coupled to ground. The two different phase sub-circuits are controlled by control logic 950 in an approximately 180 degree phase shift, such that the ripple currents in the non-resonant capacitors 906 and 908 are minimized. A negative DC input voltage at VIN 932, is converted by a conversion ratio of K and then inverted in polarity to a positive DC output voltage VOUT 930. For a given conversion ratio of K in the circuit 700 in FIG. 7, the reversed polarity converter circuit 900 of FIG. 9 would yield a conversion ratio of—(K−1).

Figure 10:
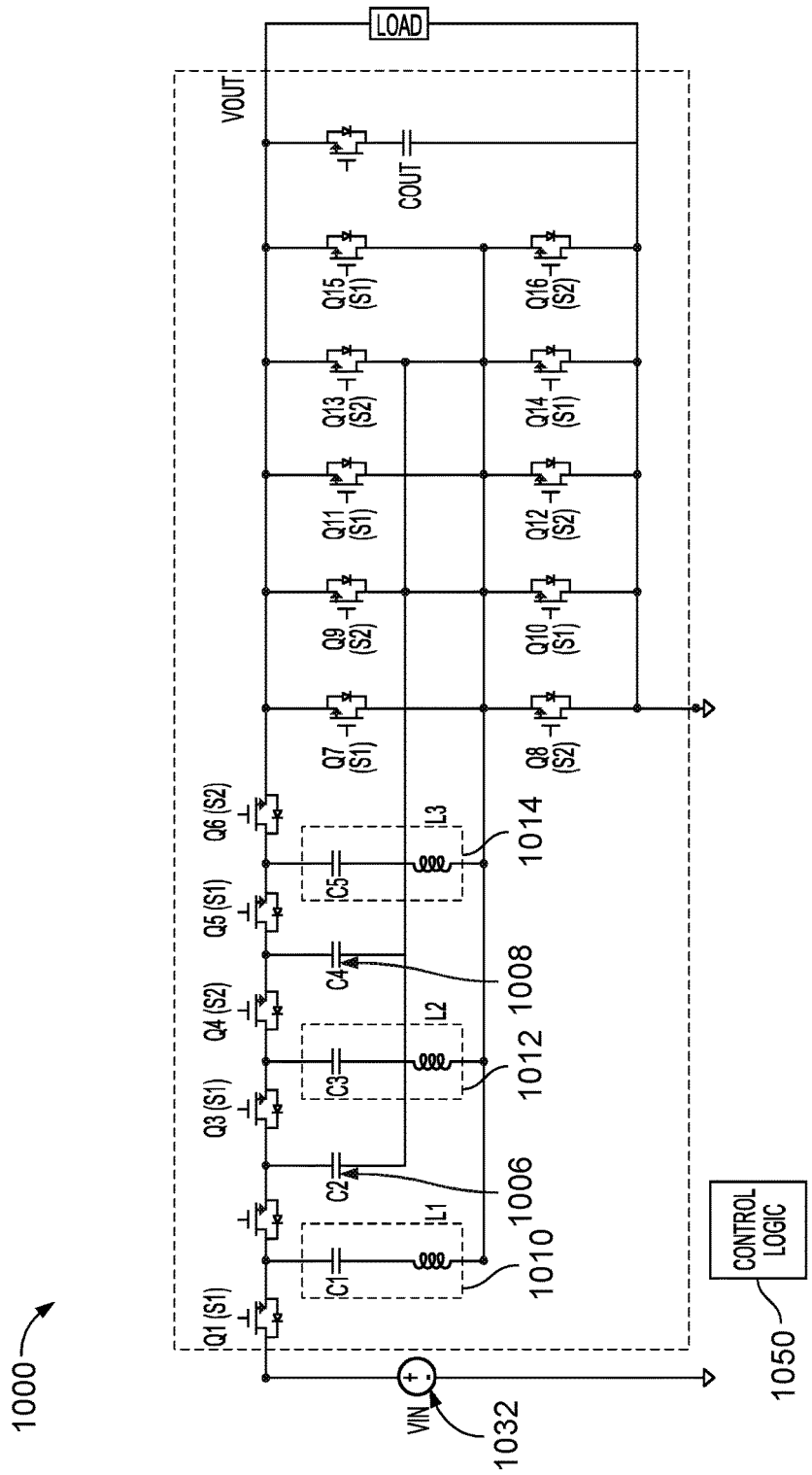
FIG. 10 is a circuit diagram of a 1-phase 6-to-1 STC topology with full-wave output rectification.

The circuit diagram 1000 in FIG. 10 is an example of a STC topology with a scaled-up voltage conversion ratio from FIG. 1. In FIG. 10, a 1-phase 6-to-1 STC full-wave rectification topology includes main switches Q1-Q6, synchronous rectifier (SR) switches Q7-Q16, resonant tanks 1010, 1012, and 1014, each included a resonant inductor Lr and resonant capacitor Cr, and non-resonant capacitors 1006 and 1008. Control signal inputs at each switch Q is provided by control logic 1050. The SR switches Q7-Q16 in circuit 1000 use multiple MOSFETs connected in parallel to achieve identical current in each MOSFET.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments. Particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. An apparatus, comprising:
  a plurality of resonant tanks;
  a plurality of switches, each switch having first and second terminals and an input that receives a control signal that places the switch in either a closed state in which a conduction path is established between the first and second terminals, or an open state in which the conduction path is eliminated between the first and second terminals;
  one or more non-resonant capacitors; and
  control logic that generates two or more sets of control signal inputs applied to the inputs of the switches so that for each set of control signals:
    one or more sub-circuit loops are formed, and wherein the one or more sub-circuit loops for a first set of control signals is different from the one or more sub-circuit loops for a second set of control signals;

each of the one or more sub-circuit loops includes one or more of the resonant tanks; and at least one of the sub-circuit loops includes at least one non-resonant capacitor; and each of the one or more non-resonant capacitors facilitates clamping of a voltage across the first and second terminals of the switch when the switch is in an open state.

2. The apparatus of claim 1, wherein:

each resonant tank includes at least one resonant inductor and one resonant capacitor and having respective first and second nodes that are connected to respective circuit nodes in a circuit;

each first terminal and each second terminal of each switch is connected to a respective circuit node in the circuit; and each of the one or more non-resonant capacitors has respective first and second nodes, and wherein each non-resonant capacitor has at least a first node connected to a circuit node formed by a connection of two switches that are each respectively connected to a respective resonant tank.

3. The apparatus of claim 2, wherein the control logic generates each set of control signals to cause zero current switching in each of the plurality of switches.

4. The apparatus of claim 3, wherein the control logic generates:

a first set of controls signals that defines a first set of switches in the closed state, and second set of switches in the open state;

a second set of controls signals that defines the first set of switches in the open state, and second set of switches in the closed state; and a third set of control signals that define both the first set of switches and the second set of switches in the open state.

5. The apparatus of claim 4, wherein the first set of control signals and the second set of control signals have respective duty cycles of less than 50%.

6. The apparatus of claim 1, wherein at least one sub-circuit loop includes a resonant tank in series with a non-resonant capacitor.

7. The apparatus of claim 1, wherein at least one sub-circuit loop includes a resonant tank in parallel with a non-resonant capacitor.

8. The apparatus of claim 1, wherein the resonant inductor in a resonant tank is a stray inductance of a circuit bearing structure.

9. The apparatus of claim 2, wherein each non-resonant capacitor has its second node connected to one of the circuit nodes in the circuit.

10. The apparatus of claim 2, wherein each non-resonant capacitor has its second node connected to a ground.

11. The apparatus of claim 2, wherein at least one circuit node receives a voltage input, and at least one circuit node generates a voltage output having a magnitude that is different from a magnitude of the voltage input.

12. The apparatus of claim 2, wherein the switches are MOSFETs, and the first terminals are drains and the second terminals are sources.

13. The apparatus of claim 12, wherein each MOSFET has current flow from drain to source when the MOSFET is in the open state, and further comprising:

a plurality of diodes, each diode connected between circuit nodes and being reversed biased when the MOSFETS are in the open state, and being forward biased when the MOSFETs are in the closed state.

14. The apparatus of claim 13, wherein the control logic generates:

a first set of controls signals that defines a first subset of the MOSFETS in the closed state and a second subset of the MOSFETS in the open state; and a second set of controls signals that defines the first set of the MOSFETS in the open state and the second set of the MOSFETs in the closed state.

15. An apparatus, comprising:

a plurality of resonant tanks;

a plurality of switches, each switch having first and second terminals and an input that receives a control signal that places the switch in either a closed state in which a conduction path is established between the first and second terminals, or an open state in which the conduction path is eliminated between the first and second terminals; and control logic that generates two or more sets of control signal inputs applied to the inputs of the switches so that for each set of control signals:

at least two sub-circuit loops are formed, and wherein the at least two sub-circuit loops for a first set of control signals are different from the at least two sub-circuit loops for a second set of control signals; and at least one circuit node receives respective currents from at least two resonant tanks that are reversed in polarity with respect to each other such that the respective currents substantially cancel each other.

16. The apparatus of claim 15, wherein:

each resonant tank including at least one resonant inductor and one resonant capacitor and having respective first and second nodes that are connected to respective circuit nodes in a circuit; and each first terminal and each second terminal of each switch is connected to a respective circuit node in the circuit.

17. The apparatus of claim 16, wherein the control logic generates each set of control signals to cause zero current switching in each of the plurality of switches.

18. The apparatus of claim 16, wherein the control logic generates:

a first set of controls signals that defines a first set of switches in the closed state, and second set of switches in the open state;

a second set of controls signals that defines the first set of switches in the state, and second set of switches in the closed state; and a third set of control signals that define both the first set of switches and the second set of switches in the state.

19. The apparatus of claim 18, wherein the first set of control signals and the second set of control signals have respective duty cycles of less than 50%.

20. The apparatus of claim 15, wherein at least one of the sub-circuit loops includes at least one non-resonant capacitor.

* * * * *

UNITED STATES PATENT AND TRADEMARK OFFICE
CERTIFICATE OF CORRECTION

PATENT NO. : 9,917,517 B1
APPLICATION NO. : 15/335029
DATED : March 13, 2018
INVENTOR(S) : Shuai Jiang et al.

It is certified that error appears in the above-identified patent and that said Letters Patent is hereby corrected as shown below:

In the Claims

Column 9, Line 49, Claim 8 – remove "claim 1," and insert --claim 2,--;

Column 10, Line 54, Claim 18 – remove "in the state" and insert --in the open state--;

Column 10, Line 57, Claim 18 – remove "in the state." and insert --in the open state.--.

Signed and Sealed this
Twenty-sixth Day of March, 2019

Andrei Iancu
*Director of the United States Patent and Trademark Office*